(12) United States Patent
Maier

(10) Patent No.: US 9,657,887 B2
(45) Date of Patent: May 23, 2017

(54) DEVICE FOR THE STABLE AND ZERO BACKLASH ADJUSTMENT OF A CAMERA-HOLDING DEVICE AROUND AT LEAST ONE TILTING AXIS

(71) Applicant: Florian Maier, Raisting (DE)

(72) Inventor: Florian Maier, Raisting (DE)

(*) Notice: Subject to any disclaimer, the term of this patent is extended or adjusted under 35 U.S.C. 154(b) by 0 days.

(21) Appl. No.: 14/413,205

(22) PCT Filed: Jul. 2, 2013

(86) PCT No.: PCT/DE2013/000353
§ 371 (c)(1),
(2) Date: Jan. 6, 2015

(87) PCT Pub. No.: WO2014/008879
PCT Pub. Date: Jan. 16, 2014

(65) Prior Publication Data
US 2015/0184792 A1 Jul. 2, 2015

(30) Foreign Application Priority Data
Jul. 7, 2012 (DE) .................... 20 2012 006 646 U

(51) Int. Cl.
*G03B 17/56* (2006.01)
*F16M 11/10* (2006.01)
(Continued)

(52) U.S. Cl.
CPC .......... *F16M 11/10* (2013.01); *F16M 11/125* (2013.01); *F16M 11/14* (2013.01);
(Continued)

(58) Field of Classification Search
CPC ...... F10M 11/10; F10M 11/125; F10M 11/14; F10M 11/18; F10M 11/126;
(Continued)

(56) References Cited

U.S. PATENT DOCUMENTS 368,652 A * 8/1887 Class .................... A63G 11/00
                                                              248/371
487,081 A * 11/1892 Staples ..................... B62J 1/02
                                                              248/371
(Continued)

FOREIGN PATENT DOCUMENTS

DE          70 01 567      5/1970
DE    10 2005 042 413      3/2007
(Continued)

*Primary Examiner* — Nkeisha Smith
(74) *Attorney, Agent, or Firm* — Henry M. Feiereisen LLC

(57) ABSTRACT

The invention relates to a device for the stable and zero backlash adjustment of a camera-holding device around at least one tilting axis, in particular on a device for multi-channel image capture, wherein the adjustment device (1) comprises two plates joined to one another so as to be tiltable, and wherein the upper plate as camera support plate (2) carries the camera (K) at least indirectly and is connected to the lower plate acting as base plate (3). The device is characterized in that a displaceable ramp slide (5) having two oppositely inclined running ramps (6) is arranged on the base plate (3), in that between the two running ramps (6) there is a joint (4) by which the camera support plate (2) is joined to the base plate (3), in that the camera support plate (2) comprises two guide pins (7) that are spaced apart from one another and are guided on the running ramps (6), and in that the device is designed in such a manner that by displacing the ramp slide (5) the camera support plate (2) assumes, with zero backlash, a defined tilting angle with respect to the base plate (3).

8 Claims, 4 Drawing Sheets

(51) Int. Cl.
*F16M 11/12* (2006.01)
*F16M 11/14* (2006.01)
*F16M 11/18* (2006.01)
*G03B 35/08* (2006.01)
*B63B 17/00* (2006.01)
*B63C 1/00* (2006.01)

(52) U.S. Cl.
CPC ............ *F16M 11/18* (2013.01); *G03B 17/561* (2013.01); *G03B 35/08* (2013.01); *B63B 17/00* (2013.01); *B63C 1/00* (2013.01)

(58) Field of Classification Search
CPC ...... F10M 11/128; F10M 11/06; F10M 11/08; G03B 17/561; G03B 35/08; B63B 17/10; B64C 1/00
USPC .......... 396/329, 419, 421, 424, 428; 348/47; 248/371
See application file for complete search history.

(56) References Cited

U.S. PATENT DOCUMENTS

| | | | | |
|---|---|---|---|---|
| 1,463,446 | A * | 7/1923 | Snowden | G03B 37/02 352/243 |
| 3,503,316 | A | 3/1970 | Takano et al. | |
| 4,095,770 | A * | 6/1978 | Long | B60N 2/39 248/371 |
| 4,763,151 | A | 8/1988 | Klinger | |
| 4,770,382 | A * | 9/1988 | Lehti | F16M 11/12 248/181.2 |
| 4,877,204 | A * | 10/1989 | Gregory | F16M 11/10 248/371 |
| 7,516,934 | B2 * | 4/2009 | Chu | B01L 9/523 248/371 |
| 9,163,776 | B2 * | 10/2015 | Hurd | F16M 11/18 |
| 2009/0090822 | A1 * | 4/2009 | Maeda | B63B 29/12 248/179.1 |
| 2012/0000570 | A1 * | 1/2012 | Foscarota | A61J 1/16 141/2 |
| 2012/0307015 | A1 | 12/2012 | Maier | |

FOREIGN PATENT DOCUMENTS

| | | |
|---|---|---|
| EP | 0 113 851 | 7/1984 |
| EP | 1 744 208 | 1/2007 |
| GB | 274272 | 7/1927 |
| GB | 1 330 491 | 9/1973 |
| WO | WO 2009/100727 | 8/2009 |
| WO | WO 2011/029426 | 3/2011 |

* cited by examiner

DEVICE FOR THE STABLE AND ZERO BACKLASH ADJUSTMENT OF A CAMERA-HOLDING DEVICE AROUND AT LEAST ONE TILTING AXIS

CROSS-REFERENCES TO RELATED APPLICATIONS

This application is the U.S. National Stage of International Application No. PCT/DE2013/000353, filed Jul. 2, 2013, which designated the United States and has been published as International Publication No. WO 2014/008879 and which claims the priority of German Patent Application, Serial No. 20 2012 006 646.3, filed Jul. 7, 2012 pursuant to 35 U.S.C. 119(a)-(d).

BACKGROUND OF THE INVENTION

The invention relates to a device for the stable and zero backlash adjustment of a camera-holding device around at least one tilting axis, in particular on a device for multi-channel image capture, wherein the adjustment device comprises two plates joined to one another so as to be tiltable and wherein the upper plate as camera support plate carries the camera at least indirectly and is connected to the lower plate acting as the base plate.

STATE OF THE ART

For the capture of images that appear to be three-dimensional and are displayed with multi-channel image presentation techniques, at least two views of the object to be recorded are necessary. The individual images are then merged to a single three-dimensional appearing image. The cameras for these recordings are either next to each other pointing in the same direction, but with a slightly different perspective (parallax), or they are mounted on two camera levels which are merged to a single level by using a partial mirror (see exemplified in WO 2011/029 426 A1)

Furthermore it is also possible to set up at least two cameras on at least two levels (see exemplified in DE 10 2005 042 413). The resulting camera view angles are thereby pointed in the same direction as well and the recordings occur in slightly different perspectives. Since the position of the optical axes of the used lenses to each other changes depending on the mounting of the cameras or their lenses and depending on the focal length, the camera position(s) should be readjusted particularly after each change of focal length to avoid so-called offsets or vertical parallaxes or otherwise wrongly calibrated pictures.

SUMMARY OF THE INVENTION

Problem and Task

Currently cameras—particularly for multi-channel image capture—are usually adjusted to each other via a tilting device where at least for one camera two supporting plates are connected to a kind of rocker and on which the reciprocal tilting adjustment is done via a screw thread, a bracket attached to a plate and a screw nut attached to another plate, which adjusts the distance between the two plates which are connected to form a rocker. Thereby the angle of a camera mounted on the rocker is adjusted vertically. Even if a fine thread is used, there has to be enough backlash in the bracket and between the screw thread and screw nut to allow the screw thread to turn smoothly. This however makes the calibration very inaccurate as the aforementioned backlash causes the rocker to not be stable on its own. Therefore the rocker has to be clamped in the respective position via an additional holding mechanism (e.g. small plates with long slot and locking screw). This does solve the stability problem, but causes two additional problems. Firstly the angular adjustment will be more or less falsified or even lost through the tightening of the locking screw; secondly the locking screw makes an immediate motoric readjustment of the angel on the tilting device impossible. Namely because for a motoric readjustment the locking screw would first have to be manually loosened or laboriously motorically opened to then have the opportunity to readjust the tilting device.

The task of the invention is to eliminate the described deficiency and provide a possible solution for a stable and zero backlash adjustment of a camera-holding device around at least one tilting axis, in particular on a device for multi-channel image capture.

Solution to the Problem

For the solution of the described tasks the invention envisages a device with the characteristics of claim 1 or 2. Advantageous designs are subject matter of the subclaims.

In the first design of the device according to the invention a pin-joint is built in (tumbler bearing or ball joint) which allows for the camera support plate to be tilted to the base plate in a pivot point fixed in its height and which joins both these plates together. To allow the selective tilting of the camera support plate in certain directions and in certain angles—e.g. forward in x-direction (tilt) and at a 90° angle to that in z-direction (roll)—the camera support plate must be exactly guided when tilted. For this, two guide pins (per tilting direction) spaced apart from one another are installed, where one is set on the one side of the ball joint and one on the other side of the joint.

On the base plate a ramp slide which can be slid vertically to the tilting axis is arranged with two oppositely inclined running ramps. This ramp slide can be mounted to the base plate with a gliding guidance (for example a dove tail or a ball bearing guidance). Both running ramps are fixedly attached to the ramp slide. The running ramps can be built as evenly inclined surfaces or respectively be curved surfaces which are built in direction of displacement through a curve, especially through a circular arc around the pivotal point of the joint. Preferably the joint is placed centered between both running ramps. The inclinations of the running ramps are in this case designed mirror-symmetrically inclined at each other or from each other.

In variation of the first design, different distances of the running ramps to the pivotal point of the joint can be compensated with different inclinations of the ramps. Also in this case, the ramps can be inclined at or from each other and be curved correspondingly. A third variation of the first design allows the guiding pins equipped with a roll to slide on the running ramps or differently designed guidances. In a second design of the device according to the invention only one guiding pin is used on one side of the joint, the roll of which runs on a sliding block of the running ramp.

In the variations 1 to 3 of the first design one of these guiding pins will be pushed up by one of the inclined running ramps when the ramp slide is displaced and at the same time the other guiding pin on the other side is moving down on the oppositely inclined running ramp, so that a displacing of the ramp slide moves the camera support plate in a defined tilting angle to the base plate with zero backlash.

The ramp slide can be moved forward or backward e.g. with a working gear spindle, an electric or magnetic motor or via pressure against a spring. So if one of the running ramps moves backwards, it is pressing the front guiding pin and with it the camera support plate through the inclined plane upwards and by drawing back of the rearward inclined running ramp makes way for the rearward guiding pin to move down. The joint keeps the camera support plate attached to the base plate which presses the rearward guiding pin to the running ramp. With this mechanism, the camera support plate can be tilted very exactly to the base plate. To keep the device at zero backlash or to lose possible backlash due to wear and tear, both guiding pins can at the distance to the plate be readjusted in their length, preferably with a fine screw thread which is also secured against accidental loosening. For better gliding, a ball or roll should preferably be mounted on the end of the guiding pin which touches the running ramp. To give the preferred ball a more stable run within the running ramp, the running ramp can either be equipped with a flute or notch, particularly a V-shaped notch, particularly milled into it, A V-shaped notch has the advantage of guiding the ball on both planes of the V-shaped notch left and right at the same time and therefore offers stable support to the ball. With this device one tilting direction can be covered. Further tilting directions e.g. to the side can be achieved through further overlying similar devices. The exact positioning in x-direction (tilt) and at 90° to that in y-direction (roll) can for example be done with two adjusting devices mounted vertically to each other. A single joint can thereby serve both adjusting devices together if it is mounted at the intersection point of the two tilting angles which are vertically aligned to each other. Particularly in this case the joint is preferably built as a tumbler bearing.

This adjusting device can also be used for gadgets on which e.g. multiple cameras are aligned to each other on a camera support plate.

BRIEF DESCRIPTION OF THE DRAWING

Description of Figures

Figure 1:
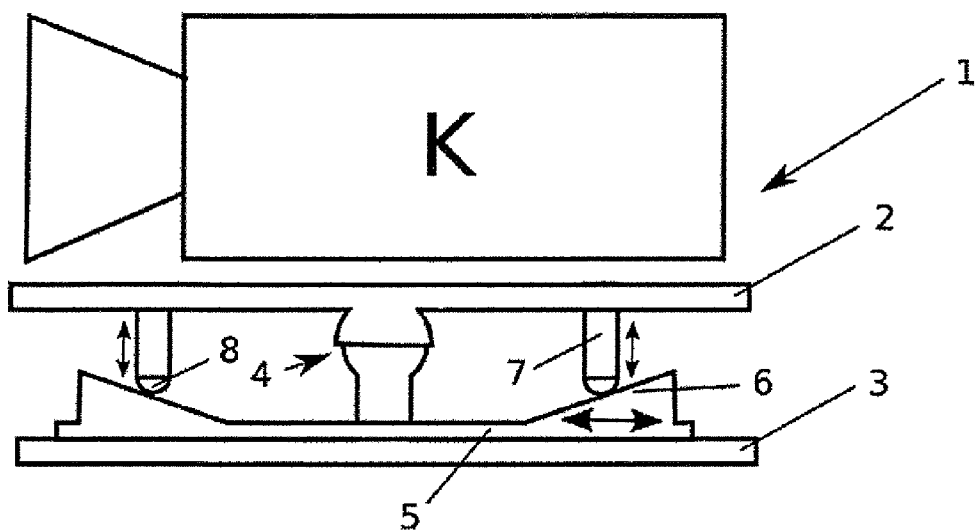
Figure 2:
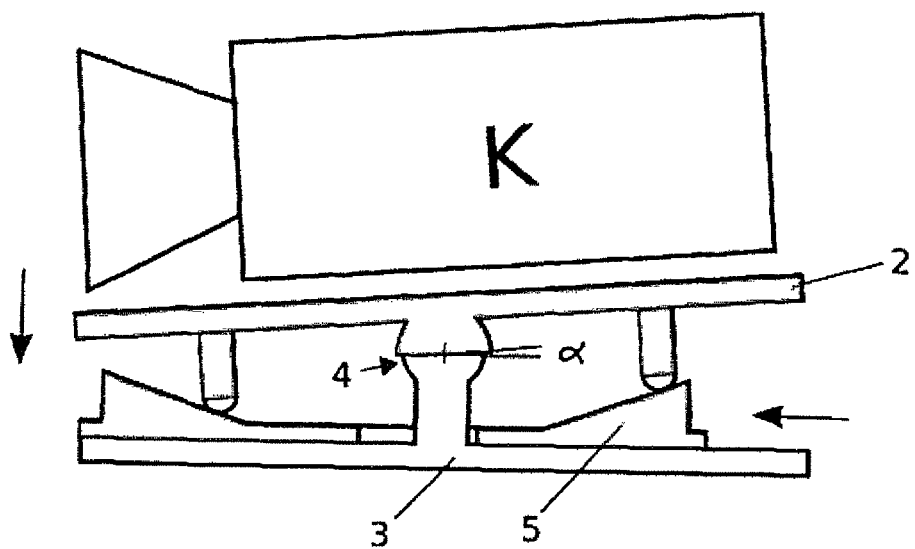
Figure 3:
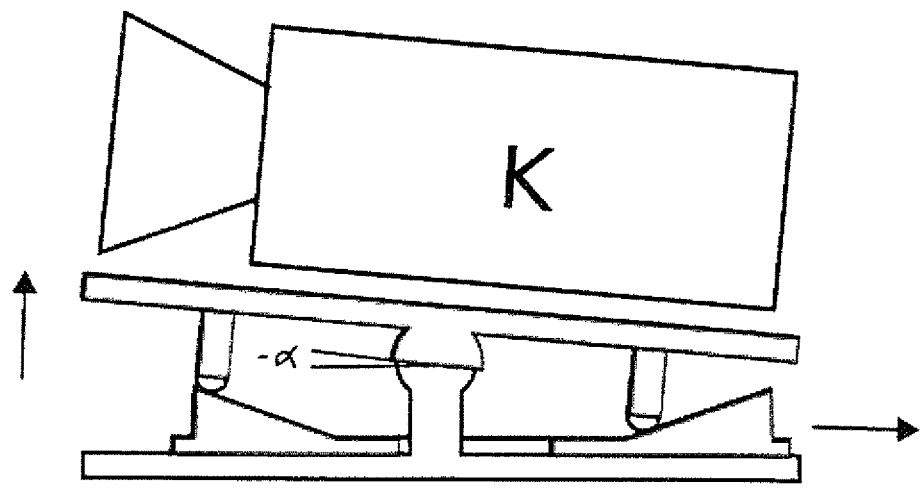
Figure 4:
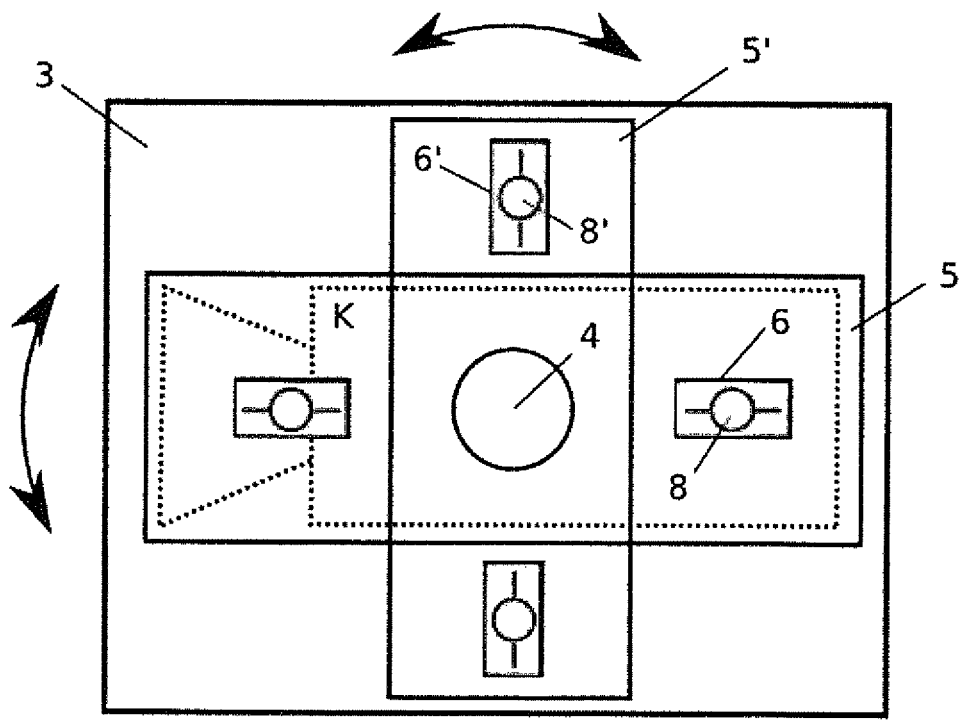
Figure 5:
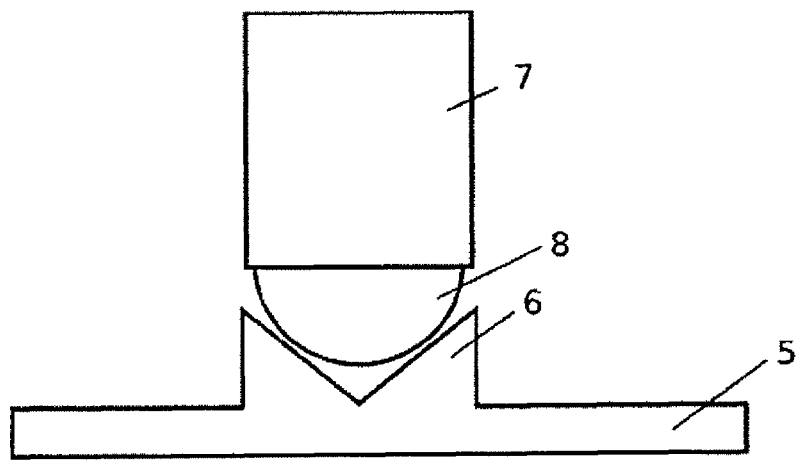
Figure 6:
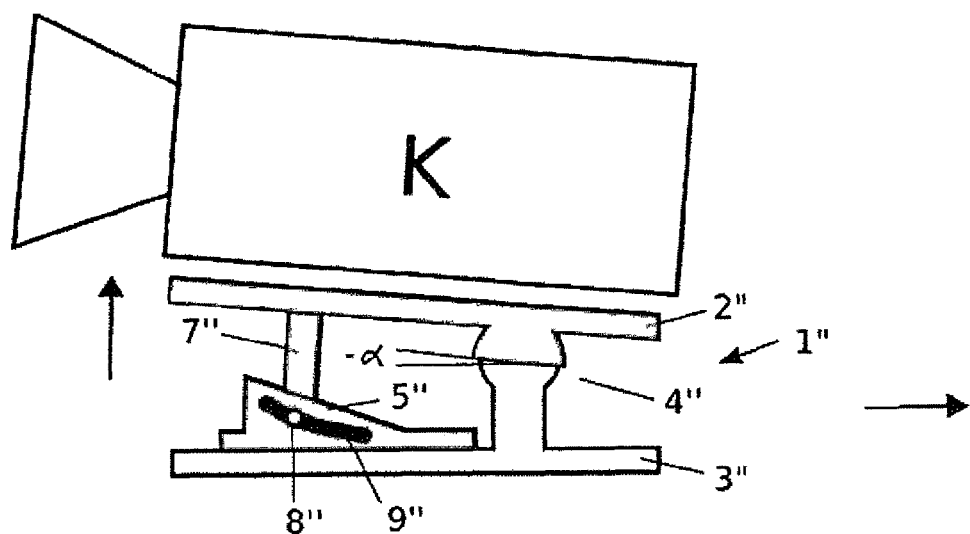

FIG. 1 shows a design of the device in horizontal position.
FIG. 2 shows the device according to FIG. 1 in forward tilted position.
FIG. 3 shows the device according to FIG. 1 in backward tilted position.
FIG. 4 shows an example of two overlying adjustment devices aligned vertically to each other.
FIG. 5 shows a model of a running ramp with a V-shaped notch.
FIG. 6 shows an additional design of the device according to the invention with only one guiding pin.

DETAILED DESCRIPTION OF PREFERRED EMBODIMENTS

FIG. 1 is a schematic representation of an adjustment device with a camera (K) mounted on a camera support plate. The connection between the camera support plate and the camera can feature further fixations or adjustment components in between. A base plate (3) mounted below which is e.g. mounted to a tripod is attached to the camera support plate (2) via a joint (4) which has a height consistent pivotal point. On the base plate (3) a ramp slide (5) which can be moved in the direction of the arrow is mounted with two oppositely inclined running ramps (6) which are here as an example shown as two inclined flat surfaces. The camera support plate (2) features two guiding pins (7) spaced apart from each other symmetrically to both sides of the joint. On the respective tips, running balls (8) are attached, which are guided on the running ramps.

FIG. 2 shows a device according to FIG. 1 in a forward tilted position. By displacing the ramp slide forward (see arrow pointing to the left) the camera support plate is tilted downwards in an angle ($\alpha$) around the pivoting point of the joint (4) (see arrow pointing downwards).

FIG. 3 shows a device according to FIG. 2 in a backward tilted position. By displacing the ramp slide backward (see arrow pointing to the right) the camera support plate is tilted upward in an angle ($\alpha$) around the pivoting point of the joint (4) (see arrow pointing upward).

FIG. 4 shows a device according to FIGS. 1 to 3 from above, but with two adjustment devices aligned vertically to each other. The ramp slides (5) and (5') are aligned at a 90° angle to each other so that an exact positioning of the camera support plate (2) in x-direction (tilt) and at 90° to that in y-direction (roll) can be achieved. The figure also shows an example of the position of the running ramps (6) and (6').

FIG. 5 shows in a vertical sectional representation of FIG. 1 an example of a ramp slide (5) with a V-shaped notch in which a running ball (8) runs at the tip of a guiding pin (7).

FIG. 6 shows an additional design of the device according to the invention which features in variation of the design in FIG. 1 only one guiding pin (7") at the tip of which a running ball (8") is mounted, which itself is guided in a sliding block like guidance (9") in the ramp slide (5"). The sliding block (9") is slightly curved in this case.

The invention claimed is:

1. A device for a stable and zero backlash adjustment of a camera-holding device around at least one tilting axis, in particular on a device for multi-channel image capture, said adjustment device comprising:
   two plates joined to one another so as to be tiltable, with an upper one of the plates configured as camera support plate and carrying a camera at least indirectly, said upper one of the plates being connected to a lower one of the plates configured to define a base plate;
   a ramp slide mounted on the base plate for vertical displacement in relation to the tilting axis;
   a joint configured to fixedly join the camera support plate to the base plate about a height consistent pivotal point, wherein a displacement of the ramp slide causes the camera support plate to assume, with zero backlash, a defined tilting angle with respect to the base plate,
   wherein the ramp slide has two oppositely inclined running ramps, said joint being placed between the two running ramps,
   wherein the camera support plate has two guide pins guided by the ramp slide, with each of the guide pins being finely adjustable in length, and disposed in spaced-apart relationship with each guide pin guided on a corresponding one of the running ramps and
   wherein at least one of the guide pins has a securing locking option.

2. The device of claim 1, wherein each of the guide pins has a running ball configured to roll on its tip and guided on a corresponding one of the running ramps.

3. The device of claim 2, wherein the running ramps each have a flute to guide the running balls.

4. The device of claim 3, wherein each flute is a V-shaped notch.

5. The device of claim 1, further comprising two of said adjustment device in vertical alignment and offset by 90° to each other, the joint connecting the two adjustment devices together.

6. The device of claim 5, wherein the joint is placed at an intersection point of two tilting angles positioned vertically to each other in a way which allows the joint to operate the two adjustment devices together.

7. The device of claim 1, wherein the joint is a tumbler bearing.

8. The device of claim 1, wherein the securing locking option is a fine screw thread.

\* \* \* \* \*